June 6, 1967 I. B. HUMPHREYS 3,323,646
CYCLONIC COUNTERFLOW SEPARATOR
Original Filed Jan. 19, 1959
2 Sheets-Sheet 1
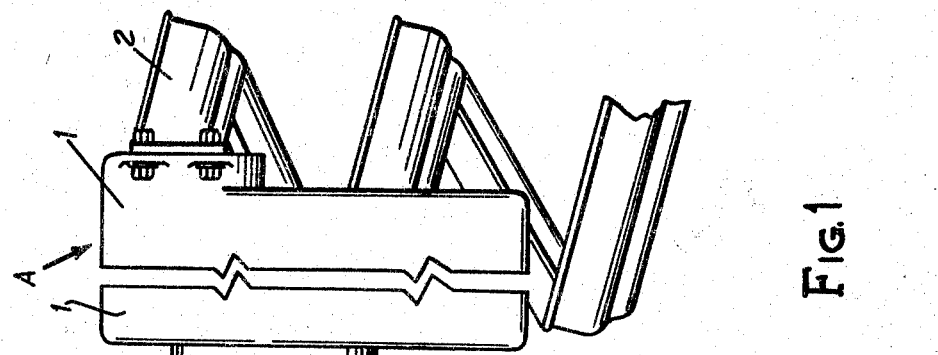
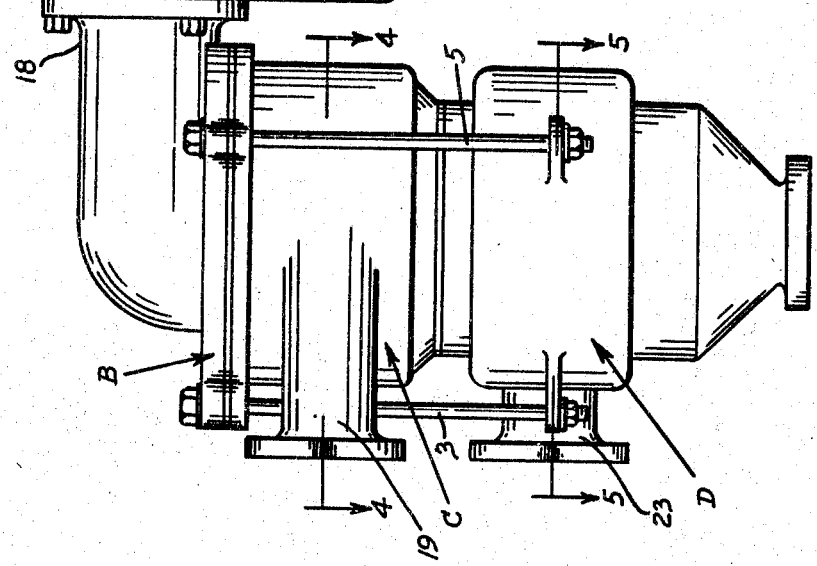
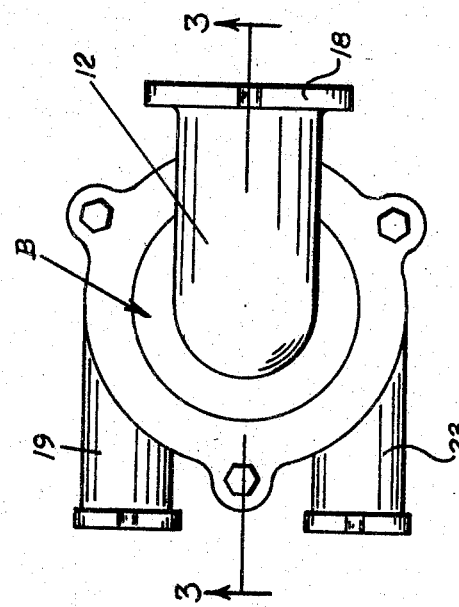
INVENTOR.
IRA B. HUMPHREYS
BY
ATTORNEY

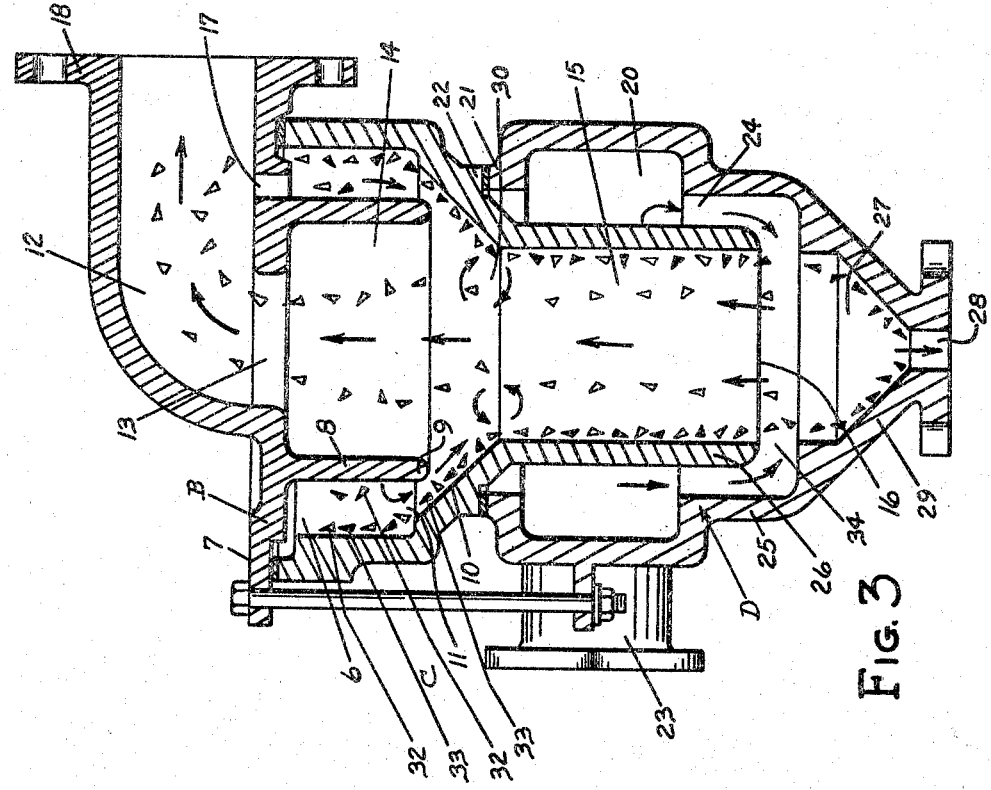
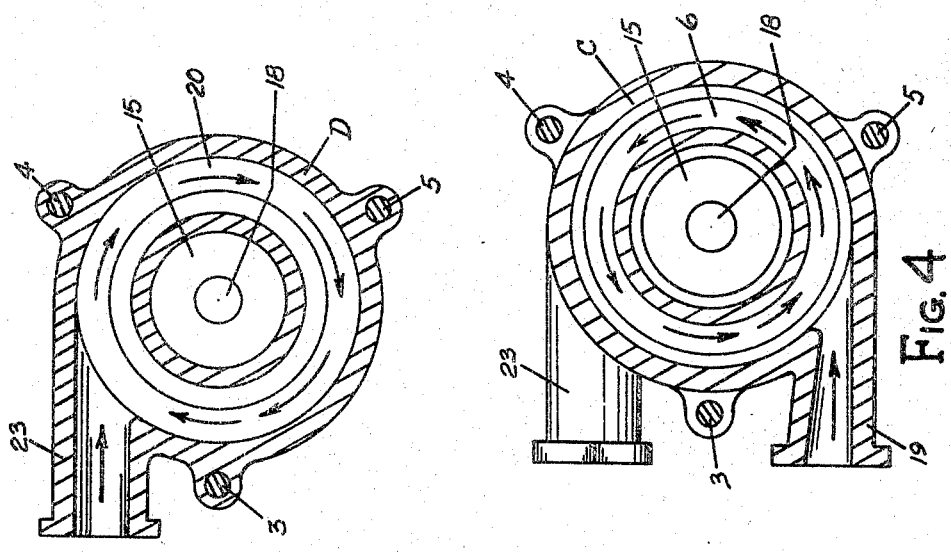

United States Patent Office 3,323,646
Patented June 6, 1967

3,323,646
CYCLONIC COUNTERFLOW SEPARATOR
Ira B. Humphreys, Denver, Colo., assignor to Humphreys Engineering Company, Denver, Colo., a corporation of Colorado
Continuation of application Ser. No. 787,646, Jan. 19, 1959. This application Dec. 13, 1963, Ser. No. 332,330
1 Claim. (Cl. 209—211)

This application is a continuation of my co-pending application, Ser. No. 787,646, filed Jan. 19, 1959, now abandoned.

This invention relates to a counter flow sizer and is directed to an apparatus for removing mineral from other solid subject matter which is fed to the machine in the form of a slurry. In its operation a sizing of the mineral which is removed from the slurry takes place, but this sizing is not precise and it would be said that the apparatus performs in general like a classifier. Precise sizing is not obtained because the separation or classification in the apparatus is by specific gravity and not by volume or mass. Both large and small heavy fines are discharged, while large and small light fines are recovered. This intermixing of fines by mass is actually desirable in the recovery operation.

The apparatus has as its primary object the recovery of minerals from a slurry made up of solids and water.

Another object of the invention is the provision of an apparatus which is extremely well suited for use in combination with the helical chute concentrators of my U.S. Patents 2,431,559 and 2,431,560, dated Nov. 25, 1947, which are shown in combination with and hereinafter described in conjunction with the present invention. A still further object of the invention is the utilization of what I term a "counter flow current" in a sizing apparatus to effect a mineral reccovery by a novel and highly efficient and effective method.

Another and further object of the invention is the provision of an apparatus for carrying out the improved method, which is extremely simple and sturdy of construction and which can be produced at a comparatively low cost.

Further objects and advantages of the apparatus and the method practiced thereby will appear from the following description when read in the light of the accompanying drawings.

In the drawings:

FIG. 1 is a view in side elevation of the sizer apparatus illustrated in conjunction with a concentrator.

FIG. 2 is a top plan view of FIG. 1.

FIG. 3 is a vertical sectional view on the line 3—3 of FIG. 2.

FIG. 4 is a horizontal section on the line 4—4 of FIG. 1.

FIG. 5 is a horizontal section on the line 5—5 of FIG. 1.

Having reference to the drawings which illustrate an apparatus found to be suitable for practicing the improved method and which illustrate the apparatus in conjunction or combination with my hereinbefore referred to patented helical chute concentrator, the helical chute concentrator is designated as an entirety by A. The precise and exact construction as well as operation of the helical chute concentrator can be determined by reference to the aforementioned U.S. patents. It is sufficient to say here that 1 is the feed box or hopper of this helical chute and from it the helical chute 2 is fed the discharge from the counter flow sizer constituting the specific present invention.

For manufacturing advantages, as well as providing easy and rapid assembly and disassembly, the counter flow sizer is composed of three elements, namely, a head B, an upper section C and a lower section D all of which are secured in assembled position by suitable elongated bolts or tie rods 3, 4 and 5. The exact constructions of these elements can be determined by reference to FIG. 3 of the drawings and will be hereinafter specifically described.

The upper section C has an upper cylindrical ring chamber 6 at its upper end. This chamber is closed at its top by the cap-like portion 7 of the head B. The head B at its under side is provided with a downwardly and circumferentially extending flange 8 which is disposed in spaced relationship to the wall of the section C forming the chamber 6. The lower end 9 of this flange stops short of the inwardly tapered portion of the section C which forms a conical surface 10. The disposition and character of the flange 8 is such as to provide at the lower end of the chamber 6 a circumferentially extending slot-like exit or outlet 11 at the bottom of the chamber. The head B is provided with an overflow pipe or conduit 12 the lower end of which is in communication through a passageway 13 with an overflow chamber 14 formed by the head flange 8.

The section C extends downwardly beyond the lower end of the conical surface 10 and is of elongated cylindrical shape to form a standpipe 15 having a lower open end 16.

The upper cylindrical ring chamber 6 is provided in its top with an air relief port 17 which communicates with the overflow pipe 12. The overflow pipe is provided at its open outlet end with a flange 18 which is suitably secured, see FIG. 1, to the feed box or hopper 1 of the helical chute concentrator.

The upper cylindrical ring chamber 6 is provided with a tangentially extending slurry inlet pipe 19 to which a slurry of sand and water or solid subject matter containing mineral is delivered from any suitable source. Due to the tangenial disposition of the pipe 19 the slurry is caused to rotate, see FIG. 4, in a counter-clockwise direction about the cylindrical ring chamber 6.

The lower section D has at its upper end a circumferentially extending cylindrical ring chamber 20 having an open top which is closed by the circumferential collar 21 having abutment with the under side of the outer face portion 22 of the inwardly and downwardly extending wall forming the conical surface 10 of the upper section. A water inlet pipe 23 communicates with the chamber 20 and extends tangentially outwardly therefrom. Water from a suitable source of supply is fed to the chamber 20 through the inlet pipe 23 and is caused to rotate about that chamber in a clockwise direction. Thus the fluid or liquid movement in the chambers 6 and 20 are the reverse of one another.

The chamber 20 has a circumferentially extending slot-like opening or passageway 24 in its bottom which passageway is formed by the space between the wall portion 25 of the section and the lower end 26 of the standpipe 15.

At its bottom the lower section D is provided with a reception chamber 27 which is so termed because it receives the heavier particles as they sink to pass to discharge through the outlet 28 in the bottom of the chamber 27. The chamber 27 is conical in shape in that its wall 29 is inclined inwardly and outwardly.

The lower open end 16 of the standpipe is in communication with the reception chamber. The water passageway 24 of the chamber 20 opens inwardly to communicate with the lower open end 16 of the standpipe.

At the upper end of the standpipe there is what I term a sorting point or throat 30. As will be hereinafter described, a vigorous counter flow sizing action takes place at the point of throat 30.

The mode of operation of the apparatus and therefore the method practiced by it is as follows: The feed to the supply pipe 19 rotates about the upper chamber 6 in a counter-clockwise direction as indicated by arrows in FIG. 4. This rotary movement of the slurry about the chamber 6 causes solids in the slurry to be centrifuged to the outside of the chamber. In FIG. 3 of the drawings the solids are illustrated by triangles with the open triangles, such as those designated 32, designating slow settling solids and with the solid or black triangles, such as those designated 33, being fast settling solids. It will be seen from FIG. 3 that the solids work their way downwardly and inwardly down or over the conical surface 10 to the sorting point or throat 30.

Simultaneously with the introduction of slurry through the pipe 19, water is admitted through the water supply pipe 23 and this rotates about the chamber 20 in a clockwise direction, and, while still rotating, feeds downwardly through the passageway 24 and travels upwardly, see the arrows in FIG. 3, through the standpipe 15 and flows through the settling solids which have entered the standpipe and have been centrifuged against the walls of the standpipe. This ascending rotating column of water carries upwardly the slow settling particles that have been entrapped at the sorting point or throat 30.

It will be seen that the settling solids at the sorting point or throat 30 meet the rising current having a counter flow direction of rotation as this rising counter flowing current reaches and passes the top of the standpipe. There is a vigorous counter flow sorting action at the sorting point 30 which sifts and sorts the slower settling mineral grains from the faster settling mineral grains represented by the solid or black triangular configurations 33. The slower settling grains are carried upward into the overflow chamber 14 and eventually outwardly through the overflow conduit 12 for delivery to the helical chute concentrator A.

The result of the foregoing is that the fast settling mineral grains settle into the reception chamber 27 and escape through the discharge outlet 28 connected to any suitable source of collection.

There is within the overflow chamber 14 a hindered settling action and within the standpipe there is a film concentrating action on the walls of the standpipe. At the bottom end of the standpipe there is a sorting action at the point 34 where the incoming rotating stream of water emerges from the passageway 24 for entry into and upwardly in the standpipe. The air relief port 17 is provided to allow the escape of any air that may have been entrapped in the slurry feed.

Modifications and changes can be made in the invention without departing from the spirit thereof. The device need not necessarily be used with a helical chute concentrator and obviously the precise nature of the discharge outlet 28 can be changed from that illustrated in the drawings. In view of the modfications which are possible in the apparatus and yet have the apparatus perform the novel and improved method, the invention is to be limited only by the scope of the hereinafter following claim.

I claim:

A sizer comprising, a vertical standpipe of uniform diameter having open upper and lower ends, an upper ring chamber of greater inside diameter than the diameter of said standpipe positioned coaxially above the upper end of the standpipe and having an open lower end in communication with the upper end of the standpipe throughout the circumference of the standpipe, a tangentially arranged slurry supply pipe communicating with said upper ring chamber, a second and lower ring chamber formed concentrically about the lower end of the standpipe and communicating with the standpipe throughout the circumference of the lower end thereof, a water supply pipe arranged tangentially to and communicating with the lower ring chamber, a conical shaped reception chamber formed as a bottom extension of the lower ring chamber below and communicating with the lower end of the standpipe and provided with a discharge outlet, an overflow chamber formed coaxially above the upper end of the standpipe and having a uniform diameter between open upper and lower ends, an overflow conduit, the lower end of the overflow chamber being in communication with the upper end of the standpipe and the upper end of the overflow chamber being in communication with the overflow conduit, an air relief port providing communication between the upper ring chamber and the overflow conduit, and the tangential dispositions of the slurry and water supply pipe being such that the rotative movement of the slurry in the upper ring chamber is reverse to the rotative movement of the water in the lower ring chamber.

References Cited

UNITED STATES PATENTS

| 2,252,581 | 8/1941 | Saint-Jacques | 209—144 |
| 2,708,033 | 5/1955 | Thomas | 209—139 |
| 2,794,832 | 6/1957 | Rietema | 209—211 X |

OTHER REFERENCES

Taggart: Handbook of Mineral Dressing, John Wiley and Sons, Inc., N.Y., 1945, TN 500 T3 C. 3 (Sect. 8, page 01 and Sect. 9, page 01).

FRANK W. LUTTER, *Primary Examiner.*

HARRY B. THORNTON, *Examiner.*